United States Patent
Kim et al.

(10) Patent No.: US 11,010,124 B2
(45) Date of Patent: May 18, 2021

(54) METHOD AND DEVICE FOR FOCUSING SOUND SOURCE

(71) Applicant: LG ELECTRONICS INC., Seoul (KR)

(72) Inventors: Sang Ki Kim, Seoul (KR); Yongchul Park, Seoul (KR); Sungmin Han, Seoul (KR); Siyoung Yang, Seoul (KR); Juyeong Jang, Seoul (KR); Minook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/703,768

(22) Filed: Dec. 4, 2019

(65) Prior Publication Data

US 2021/0096810 A1 Apr. 1, 2021

(30) Foreign Application Priority Data

Oct. 1, 2019 (KR) .................... 10-2019-0121824

(51) Int. Cl.
*H04N 5/93* (2006.01)
*G06F 3/16* (2006.01)
*G06K 9/00* (2006.01)
*G10L 25/51* (2013.01)

(52) U.S. Cl.
CPC ......... *G06F 3/165* (2013.01); *G06K 9/00744* (2013.01); *G10L 25/51* (2013.01); *H04N 5/9305* (2013.01)

(58) Field of Classification Search
CPC ........ H04S 2400/11; H04S 7/302; H04S 7/30; H04S 1/005; G11B 27/031
USPC ................ 386/385, 278, 326, 338, 339, 323
See application file for complete search history.

(56) References Cited

U.S. PATENT DOCUMENTS

2014/0376728 A1* 12/2014 Ramo .................. G06T 19/006
   381/56
2019/0147260 A1* 5/2019 May ..................... G06K 9/6288
   382/103

FOREIGN PATENT DOCUMENTS

KR 1020140086853 7/2014
KR 102000748 7/2019

* cited by examiner

*Primary Examiner* — Robert Chevalier
(74) *Attorney, Agent, or Firm* — Lee, Hong, Degerman, Kang & Waimey

(57) ABSTRACT

Disclosed are a sound source focus method and device in which the sound source focus device, in a 5G communication environment by amplifying and outputting a sound source signal of a user's object of interest extracted from an acoustic signal included in video content by executing a loaded artificial intelligence (AI) algorithm and/or machine learning algorithm. The sound source focus method includes playing video content including a video signal including at least one moving object and the acoustic signal in which sound sources output by the object are mixed, determining the user's object of interest from the video signal, acquiring unique sound source information about the user's object of interest, extracting an actual sound source for the user's object of interest corresponding to the unique sound source information from the acoustic signal, and outputting the actual sound source extracted for the user's object of interest.

19 Claims, 6 Drawing Sheets

METHOD AND DEVICE FOR FOCUSING SOUND SOURCE

CROSS-REFERENCE TO RELATED APPLICATION

Pursuant to 35 U.S.C. § 119(a), this application claims the benefit of earlier filing date and right of priority to Korean Patent Application No. 10-2019-0121824, filed on Oct. 1, 2019, the contents of which are hereby incorporated by reference herein in its entirety.

BACKGROUND

1. Technical Field

The present disclosure relates to a method and a device for focusing a sound source, and more particularly, to a method and a device for focusing a sound source which amplifies and outputs a sound source signal, extracted from an acoustic signal included in video content, of a user's object of interest.

2. Description of Related Art

Recently, in accordance with the development of semiconductors and communication technology, a large amount of data can be transmitted so that users can enjoy video content using various terminals such as a set top box, a PC, a tablet, or a smartphone. When the video content is played through a terminal, users can listen to an acoustic signal of the video content using a speaker or earphones. The user may raise or lower the volume of the video content to listen to the acoustic signal at an appropriate volume.

Korean Unexamined Patent Application Publication No. 10-2014-0086853 (Jul. 8, 2014) (hereinafter referred to as "Related Art 1") discloses an apparatus and a method for managing content, based on a speaker using voice data analysis, which extracts voice characteristic information by analyzing voice data extracted from content, in particular a video, to automatically classify and list the content based on users, and manages the videos by making a list of videos and groups the videos based on similarity with the extracted voice characteristic information.

Korean Registered Patent Publication No. 10-2000748 (Jul. 10, 2019) (hereinafter referred to as "Related Art 2") discloses a volume control method and a system for continuous playback of multiple video files, the method and system maintaining a volume of images at a constant level when videos are continuously played, after detecting the respective volume of videos transmitted from various online service providers, thereby reducing a viewer's inconvenience.

As described in Related Art 1 and 2, the user may adjust the volume of the entire acoustic signal of the video content but cannot adjust the volume of a sound source signal output by an object included in the acoustic signal. This is because the video content is played after mixing multiple sound source signals into one acoustic signal and storing the acoustic signal.

The above-described background technology is technical information that the inventors have held for the derivation of the present disclosure or that the inventors acquired in the process of deriving the present disclosure. Thus, the above-described background technology cannot be regarded as known technology disclosed to the general public prior to the filing of the present application.

SUMMARY OF THE INVENTION

An aspect of the present disclosure is to address the shortcoming of the related art in that the volume of the overall acoustic signal of video content can be adjusted, but a volume of a sound source signal, output by an object included in the acoustic signal cannot be adjusted.

Another aspect of the present disclosure is to extract a user's object of interest from a video signal, included in video content which is being played, and extract and output a sound source signal, output by the user's object of interest from an acoustic signal included in the video content which is being played.

Another aspect of the present disclosure is to extract a user's object of interest from a video signal, included in video content which is being played, based on tracking of the user's vision, and extract and output a sound source signal, output by the user's object of interest from an acoustic signal included in the video content which is being played.

Another aspect of the present disclosure is to extract a user's object of interest by the user's zoom-in operation on a video signal included in the video content which is being played, and extract and output a sound source signal, output by the user's object of interest from an acoustic signal included in the video content which is being played.

According to an aspect of the present disclosure, a sound source focus method includes amplifying and outputting a sound source signal of a user's object of interest extracted from an acoustic signal included in video content.

Specifically, according to an aspect of the present disclosure, a sound source focus method includes playing video content including a video signal, including at least one moving object, and an acoustic signal in which sound sources, output by objects, are mixed, determining a user's object of interest from the video signal, acquiring unique sound source information about the user's object of interest, extracting an actual sound source for the user's object of interest corresponding to the unique sound source information from the acoustic signal, and outputting an actual sound source extracted for the user's object of interest.

According to the sound source focus method of the present embodiment, it is possible to watch videos with a sense of realism by extracting a user's object of interest from a video signal included in video content which is being played, and extracting and outputting a sound source signal, output by the user's object of interest from an acoustic signal included in the video content which is being played.

Furthermore, the process of determining a user's object of interest includes: extracting, from the video signal, an image of a user's object of interest, which includes the user's object of interest, in accordance with tracking of the user's vision; and determining the type that the user's object of interest belongs to based on the characteristic information about the image of the user's object of interest.

The acquiring of unique sound source information includes: acquiring the type of the user's object of interest and unique sound source information output by the user's object of interest from an image of the user's object of interest, using a deep neural network model which is trained in advance to output the type of the object and unique sound source information, output by the object from an image of the object.

Furthermore, the sound source focus method, according to the present embodiment, may further include, when the tracking of the user's vision is complete, completing the extraction of the actual sound source for the user's object of interest and resuming playing the video content including an acoustic signal in which sound sources, output by the objects, are mixed.

Furthermore, the determining of a user's object of interest includes: extracting, from the video signal, an image of a user's object of interest, including the user's object of interest as an object which is magnified in accordance with the user's zoom-in operation; and determining the type of the user's object of interest based on characteristic information about the image of the user's object of interest.

Furthermore, the sound source focus method, according to the present embodiment, may further include, when the user's zoom-out operation is received, completing the extraction of the actual sound source for the user's object of interest and resuming playing the video content including an acoustic signal, in which sound sources output by the objects are mixed.

The outputting of an actual sound source may further include amplifying and outputting an actual sound source extracted for the user's object of interest.

The outputting of an actual sound source may further include attenuating and outputting a sound source output from the other objects, excluding the user's object of interest.

Furthermore, the sound source focus method, according to the embodiment of the present disclosure, may further include, after the determining of a user's object of interest, processing the user's object of interest to be brighter than the objects other than the user's object of interest in order to play the video content.

According to another aspect of the present disclosure, a sound source focus device is a sound source focus device including one or more processors and one or more processors may be configured to play video content including a video signal, including at least one moving object, and an acoustic signal in which sound sources, output by objects, are mixed, to determine a user's object of interest from the video signal, to acquire unique sound source information for the user's object of interest, to extract an actual sound source for the user's object of interest corresponding to unique sound source information from the acoustic signal, and to output an actual sound source extracted for the user's object of interest.

According to the sound source focus device of the present disclosure, it is possible to watch videos with a sense of realism by extracting a user's object of interest from a video signal included in video content which is being played and extracting and outputting a sound source signal, output by the user's object of interest, from an acoustic signal included in the video content which is being played.

Furthermore, one or more processors may be further configured to, when the unique sound source information is acquired, acquire the type of a user's object of interest and acquire unique sound source information output by the user's object of interest from an image of the user's object of interest, using a deep neural network model which is trained in advance to output the type of the object and unique sound source information output by the object from an object image.

Furthermore, one or more processors may be further configured to, when the tracking of the user's vision is complete, complete the extraction of the actual sound source for the user's object of interest and to resume playing the video content including an acoustic signal in which sound sources output by the objects are mixed.

Furthermore, one or more processors may be further configured to, when the user's object of interest is determined, extract an image of the user's object of interest, including the user's object of interest as an object which is magnified in accordance with the user's zoom-in operation from the video signal, and to determine the type of the user's object of interest based on characteristic information about the image of the user's object of interest.

Furthermore, one or more processors may be further configured to, when the user's zoom-out operation is received, complete the extraction of the actual sound source for the user's object of interest and to resume playing the video content including an acoustic signal in which sound sources output by the objects are mixed.

Furthermore, one or more processors may be further configured to, when an actual sound source is output, amplify and output the actual sound source extracted for the user's object of interest.

Furthermore, one or more processors may be further configured to, when the actual sound source is output, attenuate and output a sound source output by the objects other than the user's object of interest.

Furthermore, one or more processors may be configured to, after determining the user's object of interest, process the user's object of interest to be brighter than the objects other than the user's object of interest in order to play the video content.

In addition, another method and another system for implementing the present disclosure and a computer readable recording medium, in which a computer program which executes the method is stored, may be further provided.

Other aspects and features as well as those described above will become clear from the accompanying drawings, the claims, and the detailed description of the present disclosure.

According to the present disclosure, it is possible to watch videos with a sense of realism by extracting a user's object of interest from a video signal, included in video content which is being played, and extracting and outputting a sound source signal output by the user's object of interest from an acoustic signal included in the video content which is being played.

The user may be able to listen to a desired sound source by extraction of the user's object of interest from a video signal, included in the video content which is being played, and extracting and outputting a sound source signal output by the user's object of interest from an acoustic signal, included in the video content which is being played, so that user's satisfaction while playing video content may be increased.

Furthermore, even though the sound source focus device itself is a mass-produced uniform product, the user perceives the sound source focus device as a personalized device, so that an effect of a user-customized product may be achieved.

Furthermore, a dynamic spoken utterance, about an spoken utterance which is output using only an optimal processor resource, is generated and output, in accordance with external circumstantial information, such that power efficiency of the sound source focus device may be improved.

The effects of the present disclosure are not limited to those mentioned above, and other effects not mentioned can be clearly understood by those skilled in the art from the following description.

BRIEF DESCRIPTION OF DRAWINGS

The above and other aspects, features, and advantages of the present disclosure will become apparent from the detailed description of the following aspects in conjunction with the accompanying drawings, in which.

DETAILED DESCRIPTION

Figure 1:
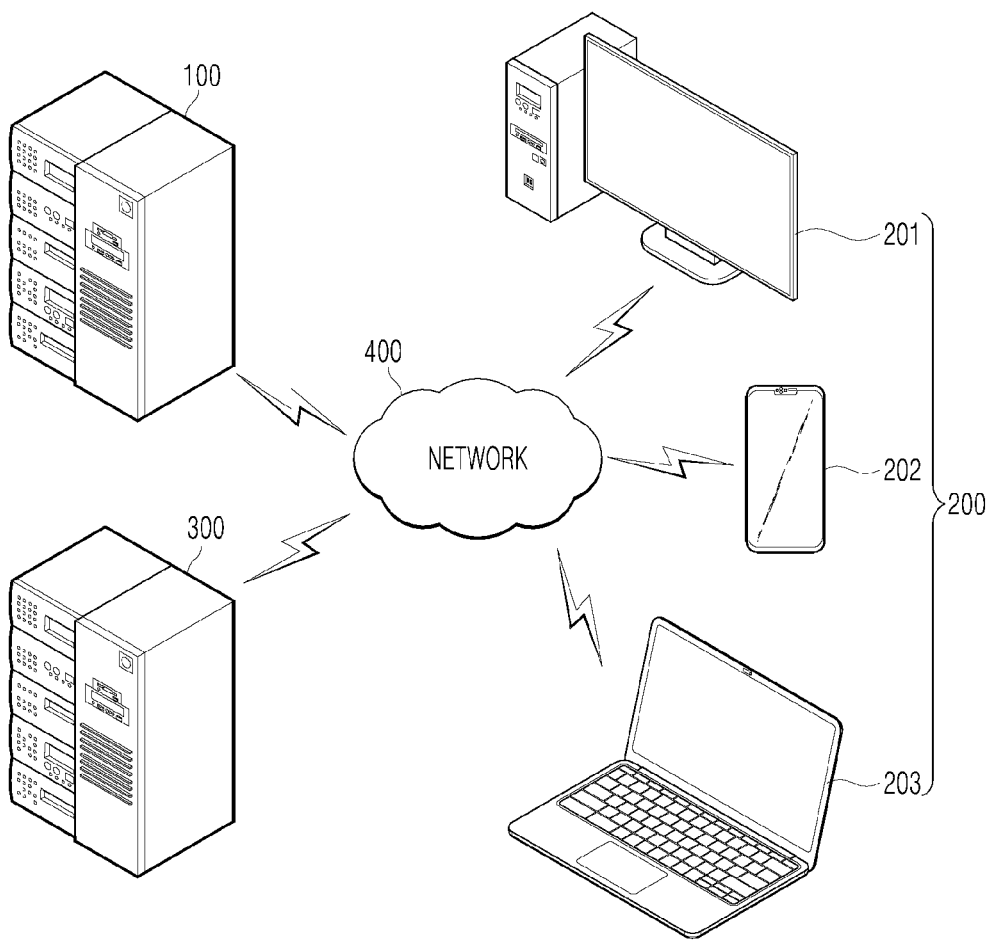
FIG. 1 is a view schematically illustrating a sound source focus system according to an embodiment of the present disclosure.

The advantages and features of the present disclosure and methods to achieve them will be apparent from the embodiments described below in detail in conjunction with the accompanying drawings. However, the description of particular exemplary embodiments is not intended to limit the present disclosure to the particular exemplary embodiments disclosed herein, but on the contrary, it should be understood that the present disclosure is to cover all modifications, equivalents and alternatives falling within the spirit and scope of the present disclosure. The exemplary embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification if it is determined that such details are not necessary to obtain a complete understanding of the present disclosure.

The terminology used herein is used for the purpose of describing particular exemplary embodiments only and is not intended to be limiting. As used herein, the singular forms are intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms, are used only to distinguish one element from another element. These terms are generally used only to distinguish one element from another.

Hereinafter, embodiments of the present disclosure will be described in detail with reference to the accompanying drawings. Like reference numerals designate like elements throughout the specification, and overlapping descriptions of the elements will be omitted.

FIG. 1 is a diagram schematically illustrating a sound source focus system according to an embodiment of the present disclosure. Referring to FIG. 1, the sound source focus system 1 may include a sound source focus device 100, a user terminal 200, a server 300, and a network 400.

The sound source focus device 100 may play video content. Here, the video content may include a video signal, including at least one moving object, and an acoustic signal in which sound sources output by the object are mixed. The acoustic signal may be played in synchronization with the video signal. The sound source focus device 100 may play video content which is already stored or play video content received from the outside through the network 400. The sound source focus device 100 may include a multi-media player and the multi-media player may perform various functions to take pictures or videos, play music or video content, play games, or receive broadcasting.

The sound source focus device 100 may determine a user's object of interest from the video signal while playing the video content. Here, in order to determine the user's object of interest, an vision tracking method and/or zoom-in method may be used.

The sound source focus device 100 may acquire unique sound source information for the determined user's object of interest. The unique sound source information refers to a characteristic value of a sound which can be produced only by the corresponding object and includes a pitch, a tone, a harmonic structure, mel frequency cepstral coefficients (MFCC), mel generalized cepstral (MGC), and the like. Furthermore, the object may include people, things, or musical instruments which output a sound source. For example, when the object is people, since every human's voice has a unique tone, the tone of humans may be unique sound source information. Furthermore, when the object is a musical instrument, since every musical instrument has a unique tone, the tone of musical instruments may be unique sound source information.

Figure 3:
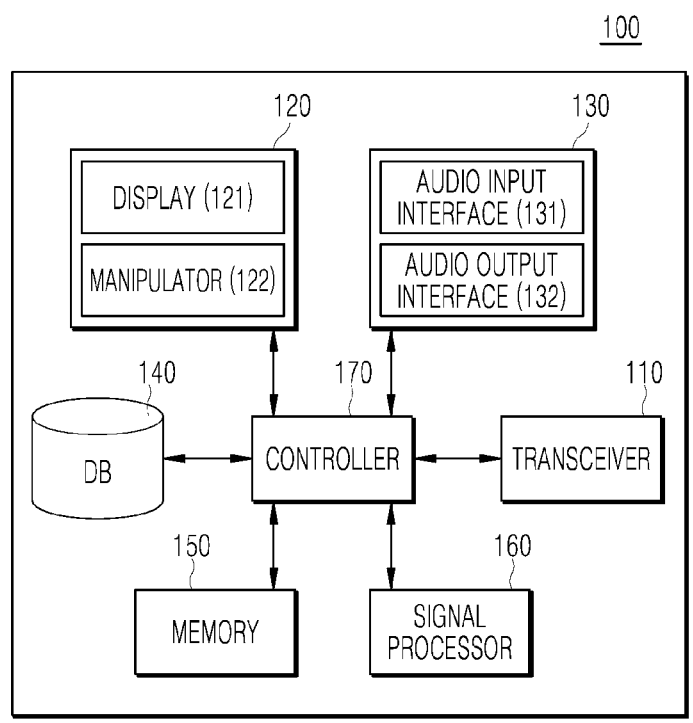
FIG. 3 is a view schematically illustrating a detailed configuration of a sound source focus device of the sound source focus system of FIG. 1.

The sound source focus device 100 may acquire, from a database 140, unique sound source information for the user's object of interest (see FIG. 3). The sound source focus device 100 may access a site, an application, or a sound source providing device (not illustrated) which provides sound source information through the network 400 in order to acquire unique sound source information for the user's object of interest. Moreover, the sound source focus device 100 acquires the type of the user's object of interest and unique sound source information, output by the user's object of interest, from an image of the user's object of interest using a deep neural network model, which is trained in advance to output the type of the object and the unique sound source information output by the object from an object image.

The sound source focus device 100 may extract an actual sound source for the user's object of interest corresponding to the unique sound source information from the acoustic signal, while playing the video content. The sound source focus device 100 may extract an actual sound source for the user's object of interest by filtering the unique sound source information obtained from the acoustic signal.

The sound source focus device 100 may acquire an actual sound source extracted for the extracted user's object of interest. Here, the sound source focus device 100 may output an actual sound source for the user's object of interest amplified by multiplying the extracted actual sound source by a predetermined gain.

The user terminal 200 may monitor state information of the sound source focus device 100, through an authentication process, after accessing a sound source focus application or a sound source focus site or may be provided with a service which operates or controls the sound source focus device 100. In the present embodiment, for example, when the sound source focus device 100 plays the video content, the user terminal 200, which completes the authentication process, instructs an operation mode of the sound source focus device 100 to operate the sound source focus device 100 or to control the operation of the sound source focus device 100.

The user terminal 200 may include a communication terminal capable of executing a function of a computing device (not shown). In the present embodiment, the user terminal 200 may include, but is not limited to, a desktop computer 201, a smartphone 202, a laptop computer 203, a tablet PC, a smart TV, a cell phone, a personal digital assistant (PDA), a laptop, a media player, a micro server, a global positioning system (GPS) device, an electronic book terminal, a digital broadcast terminal, a navigation device, a kiosk, an MP3 player, a digital camera, a home appliance, and other mobile or immobile computing devices operated by the user. Furthermore, the user terminal 200 may be a wearable terminal having a communication function and a data processing function, such as a watch, glasses, a hair band, or a ring. The user terminal 200 is not limited to the above-mentioned devices, and thus any terminal that supports web browsing may be adopted.

The server 300 may be a database server, which provides big data required for applying a variety of artificial intelligence algorithms and data related to voice recognition. In addition, the server 300 may include a web server or an application server which controls an operation of the sound source focus device 100 using an application or a web browser installed in the user terminal 200.

Artificial intelligence (AI) is an area of computer engineering science and information technology that studies methods to make computers mimic intelligent human behaviors such as reasoning, learning, self-improving, and the like.

In addition, artificial intelligence does not exist on its own, but is rather directly or indirectly related to a number of other fields in computer science. In recent years, there have been numerous attempts to introduce an element of the artificial intelligence into various fields of information technology to solve problems in the respective fields.

Machine learning is an area of artificial intelligence that includes the field of study that gives computers the capability to learn without being explicitly programmed Specifically, machine learning may be a technology for researching and constructing a system for learning, predicting, and improving its own performance based on empirical data and an algorithm for the same. Machine learning algorithms, rather than only executing rigidly-set static program commands, may be used to take an approach that builds models for deriving predictions and decisions from inputted data.

The server 300 receives the user's object of interest from the sound source focus device 100, determines the type of the user's object of interest, and acquires the unique sound source information, output by the user's object of interest, to transmit the unique sound source information to the sound source focus device 100. The server 300 may acquire the type of a user's object of interest and unique sound source information, output by the user's object of interest, from an image of the user's object of interest using a deep neural network model which is trained in advance to output the type of the object and unique sound source information output by the object from an object image.

The server 300 receives video content from the sound source focus device 100 and extracts an actual sound source for the user's object of interest corresponding to the unique sound source information, output by the user's object of interest, from the acoustic signal in order to transmit the actual sound source to the sound source focus device 100.

In accordance with a processing capability of the sound source focus device 100, the sound source focus device 100 may at least partially acquire the unique sound source information for the user's object of interest and extract an actual sound source for the user's object of interest.

The network 400 may serve to connect the sound source focus device 100, the user terminal 200, and the server 300 to each other. The network 400 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 400 may send and receive information by using the short distance communication and/or the long distance communication. The short distance communication may include Bluetooth®, radio frequency identification (RFID), infrared data association (IrDA), ultra-wideband (UWB), ZigBee, and wireless fidelity (Wi-Fi) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 400 may include a connection of network elements such as a hub, a bridge, a router, a switch, and a gateway. The network 400 may include one or more connected networks, for example, a multi-network environment, including a public network such as an Internet and a private network such as a safe corporate private network. The access to the network 400 may be provided via one or more wired or wireless access networks. Further, the network 400 may support 5G communications and/or an Internet of things (IoT) network for exchanging and processing information between distributed components such as objects.

Figure 2:
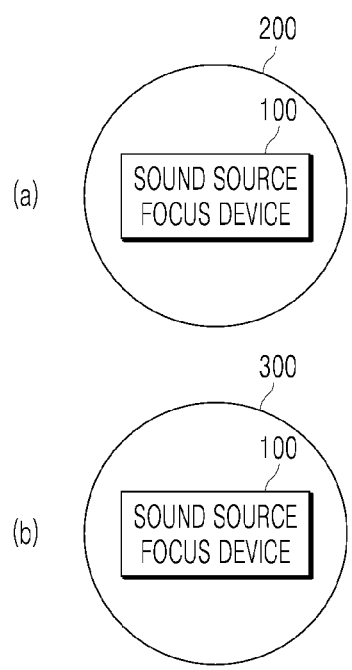
FIG. 2 is a view schematically illustrating a sound source focus system according to another embodiment of the present disclosure.

FIG. 2 is a view schematically illustrating a sound source focus system according to another embodiment of the present disclosure. Hereinafter, description overlapping with that of FIG. 1 will be omitted.

Referring to FIG. 2A, the sound source focus device 100 may be included in the user terminal 200. Referring to FIG. 2B, the sound source focus device 100 may be included in the server 300. The sound source focus device 100 may be included in the user terminal 200 or the server 300 in various manners. As a specific embodiment, the sound source focus device 100 may be installed in the user terminal 200 or the server 300 through the network 400. For example, the sound source focus device 100 may be installed in the user terminal 200 or the server 300 as one application. As another specific embodiment, the sound source focus device 100 may be installed off-line in the user terminal 200 or the server 300. However, the above embodiments are merely illustrative, and the present disclosure is not limited thereto. Therefore, the sound source focus device 100 may be included in the user terminal 200 or the server 300 in various manners.

FIG. 3 is a view schematically illustrating a detailed configuration of a sound source focus device of the sound source focus system of FIG. 1. In the following description, description of parts that are the same as those in FIG. 1 and FIG. 2 will be omitted. Referring to FIG. 2, the sound source focus device 100 may include a transceiver 110, a user interface 120 including a display 121 and a manipulator 122, an audio processor 130 including an audio input interface 131 and an audio output interface 132, a database 140, a memory 150, a signal processor 160, and a controller 170.

The transceiver 110 may interwork with the network 400 to provide a communication interface required for providing, in the form of packet data, transmission and reception signals among the sound focus device 100 and/or the user terminal 200 and/or the server 300. Furthermore, the transceiver 110 may receive an information request signal from the user terminal 200, and transmit information processed by the speech processing apparatus 100 to the user terminal 200. Furthermore, the transceiver 110 may transmit the information request signal from the user terminal 200 to the server 300, receive a response signal processed by the server 300, and then transmit the response signal to the user terminal 200. Furthermore, the transceiver 110 may be a device including hardware and software required for transmitting and receiving signals such as a control signal and a data signal via a wired or wireless connection to another network device.

Furthermore, the transceiver 110 may support a variety of object-to-object intelligent communication, for example, Internet of things (IoT), Internet of everything (IoE), and Internet of small things (IoST), and may support, for example, machine to machine (M2M) communication, vehicle to everything (V2X) communication, and device to device (D2D) communication.

The display 121 of the user interface 120 may display an operation state of the sound source focus device 100, that is, a video content playback state controlled by the controller 170. Depending on the embodiment, the display 121 may form an inter-layer structure with a touch pad so as to be configured as a touch screen. Here, the display 121 may also be used as the manipulator 122 capable of inputting information through a touch of a user. To this end, the display 121 may be configured with a touch-sensitive display controller or other various input and output controllers. As an example, the touch recognition display controller may provide an output interface and an input interface between the device and the user. The touch recognition display controller may transmit and receive electric signals to and from the controller 170. Also, the touch recognition display controller may display a visual output to the user, and the visual output may include text, graphics, images, video, and a combination thereof. The display 121 may be a predetermined display member, such as a touch-sensitive organic light emitting display (OLED), liquid crystal display (LCD), or light emitting display (LED).

The manipulator 122 of the user interface 120 may have a plurality of operation buttons (not shown) to transmit signals corresponding to the buttons to the controller 170. This manipulator 122 may be configured with a sensor, button, or switch structure capable of recognizing a touch or pressing operation of the user. In this embodiment, the manipulator 122 may transmit to the controller 170 an operation signal operated by the user in order to check or modify various information regarding the operation of the sound source focus device 100 displayed on the display 121. In the present embodiment, in the case where the sound source focus device 100 is included in the user terminal 200, the user interface 120 may be replaced with a display (not shown) and manipulator (not shown) of the user terminal 200.

The audio input interface 131 of the audio processor 130 receives a voice and transmits the voice to the controller 170, and the controller 170 transmits an utterance voice of the user to the signal processor 160 to perform voice recognition processing. To this end, the audio input interface 131 may be provided with one or more microphones (not illustrated). Furthermore, the audio input interface 131 may be provided with a plurality of microphones (not shown) to more accurately receive a spoken utterance. Here, each of the plurality of microphones may be spaced apart from each other at different positions, and may process the received spoken utterance of the user as an electrical signal.

In an optional embodiment, the audio input interface 131 may use various noise elimination algorithms for eliminating noise generated while receiving a voice of the user. In an optional embodiment, the audio input interface 131 may include various elements for processing an audio signal, such as a filter (not shown) for eliminating noise when receiving the voice of the user and an amplifier (not shown) for amplifying and outputting a signal output from the filter.

The audio output interface 132 of the audio processor 130 may output: a notification message, related to, for example, a warning, an operation mode, an operation state, or an error state; a processing result corresponding to the voice (voice command) of the user; and an acoustic signal included in the video content according to the control of the controller 170. In the present embodiment, the audio output interface 132 may output an amplified signal, generated by the signal processor 160, of an actual sound source for the user's object of interested. The audio output interface 132 may convert electric signals from the controller 170 into audio signals, and output the audio signals. To this end, the audio output interface 142 may be provided with a speaker or the like.

In the present embodiment, when the sound source focus device 100 is included in the user terminal 200, the audio processor 130 may be replaced with an audio input interface (not shown) and audio output interface (not shown) of the user terminal 200.

The database 140 may include a management database for storing information collected and generated by the sound source focus device 100. Here, the management database may store unique sound source information for each object. Furthermore, the management database may store a user's object of interest determination history and a history of an object's unique sound source information provision.

The database 140 may further include a user database for storing user information. Here, the user database may store user information requesting a sound source focus using the sound source focus device 100. Here, the user information may include: basic information about an object such as name, affiliation, personal data, gender, age, contact information, email, and address; authentication (login) information such as an ID (or email) and a password; and access-related information such as an access country, an access location, information about a device used for access, and an accessed network environment.

The memory 150 stores various information required for the operation of the sound source focus device 100 and stores a control software which operates the sound source focus device 100 and includes a volatile or a non-volatile recording medium. Furthermore, the memory 150 may store various video content to be played by the sound source focus device 100. The memory 150 can store, for example, a command to be executed by the signal processor 160 a command to determine a user's object of interest from a video signal when the video content is played, a command to acquire unique sound source information for the user's object of interest, a command to extract an actual sound source for the user's object of interest corresponding to unique sound source information from an acoustic signal, and a command to amplify and output an actual sound source for the user's object of interest. Furthermore, the memory 150 may store various information which is processed by the signal processor 160.

Here, the memory 150 may include a magnetic storage medium or a flash storage medium, but the scope of the present disclosure is not limited thereto. The memory 150 may include a built-in memory and/or an external memory, and may include a volatile memory such as a DRAM, an SRAM, or an SDRAM, a non-volatile memory such as a one-time programmable ROM (OTPROM), a PROM, an EPROM, an EEPROM, a mask ROM, a flash ROM, a NAND flash memory, or a NOR flash memory, a flash drive such as a solid state disk (SSD) compact flash (CF) card, an SD card, a Micro-SD card, a Mini-SD card, an Xd card, or a memory stick, or a storage device such as a HDD.

When the video content, including a video signal including at least one moving object and an acoustic signal in which sound sources output by the object are mixed, is played, the signal processor 160 may determine the user's object of interest from the video signal. The signal processor 160 may acquire unique sound source information for the user's object of interest. The signal processor 160 may extract an actual sound source for the user's object of interest corresponding to the unique sound source information from the acoustic signal. The signal processor 160 may output the actual sound source extracted for the user's object of interest.

In the present embodiment, the signal processor 160 may perform training in connection with the controller 170, or may receive training results from the controller 170. In this embodiment, the signal processor 160 may be provided outside the controller 170 as illustrated in FIG. 3, or may be provided inside the controller 170 and operate like the controller 170, or may be provided within the server 300 of FIG. 1. Hereinafter, the signal processor 160 will be described in greater detail with reference to FIG. 4.

The controller 170 may control the entire operation of the sound source focus device 100 by driving the control software stored in the memory 150 as a kind of central processing device. The controller 170 may include any type of device capable of processing data, such as a processor. Here, the "processor" may, for example, refer to a data processing device embedded in hardware, which has a physically structured circuitry to perform a function represented by codes or instructions contained in a program. As examples of the data processing device embedded in hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

In the present embodiment, the controller 170 may perform machine learning, such as deep learning, to acquire the unique sound source information for the user's object of interest so as to allow the sound source focus device 100 to amplify and output an actual sound source for the user's object of interest and the memory 150 may store result data and data used for the machine learning.

Deep learning, which is a subfield of machine learning, enables data-based learning through multiple layers. As the number of layers in deep learning increases, the deep learning network may acquire a collection of machine learning algorithms that extract core data from multiple datasets.

Deep learning structures may include an artificial neural network (ANN), and may include a convolutional neural network (CNN), a recurrent neural network (RNN), a deep belief network (DBN), and the like. The deep learning structure according to the present embodiment may use various structures well known in the art. For example, the deep learning structure according to the present disclosure may include a CNN, an RNN, a DBN, and the like. RNN is widely used in natural language processing and may configure an artificial neural network structure by building up layers at each instant in a structure that is effective for processing time-series data which vary with time. A DBN may include a deep learning structure formed by stacking up multiple layers of restricted Boltzmann machines (RBM), which is a deep learning scheme. When a predetermined number of layers are constructed by repetition of RBM learning, the DBN having the predetermined number of layers may be constructed. A CNN may include a model mimicking a human brain function, which is built under the assumption that when a person recognizes an object, the brain extracts the most basic features of the object and recognizes the object based on the result of complex calculations in the brain.

Meanwhile, learning of an artificial neural network may be performed by adjusting a weight of a connection line (also adjusting a bias value, if necessary) between nodes so that a desired output is achieved with regard to a given input. Also, the artificial neural network can continuously update the weight values through learning. Furthermore, methods such as back propagation may be used in training the artificial neural network.

As described above, the controller 170 may be provided with an artificial neural network and perform machine learning-based user recognition and user's voice recognition using received audio input signals as input data.

The controller 170 may include an ANN, such as a deep neural network (DNN) including a CNN, an RNN, a DBN, and so forth, and may train the DNN. As a machine learning method for such an artificial neural network, both unsupervised learning and supervised learning may be used. The controller 170, after learning according to the setting, may control such that a speech tone recognition artificial neural network structure is updated.

Figure 4:
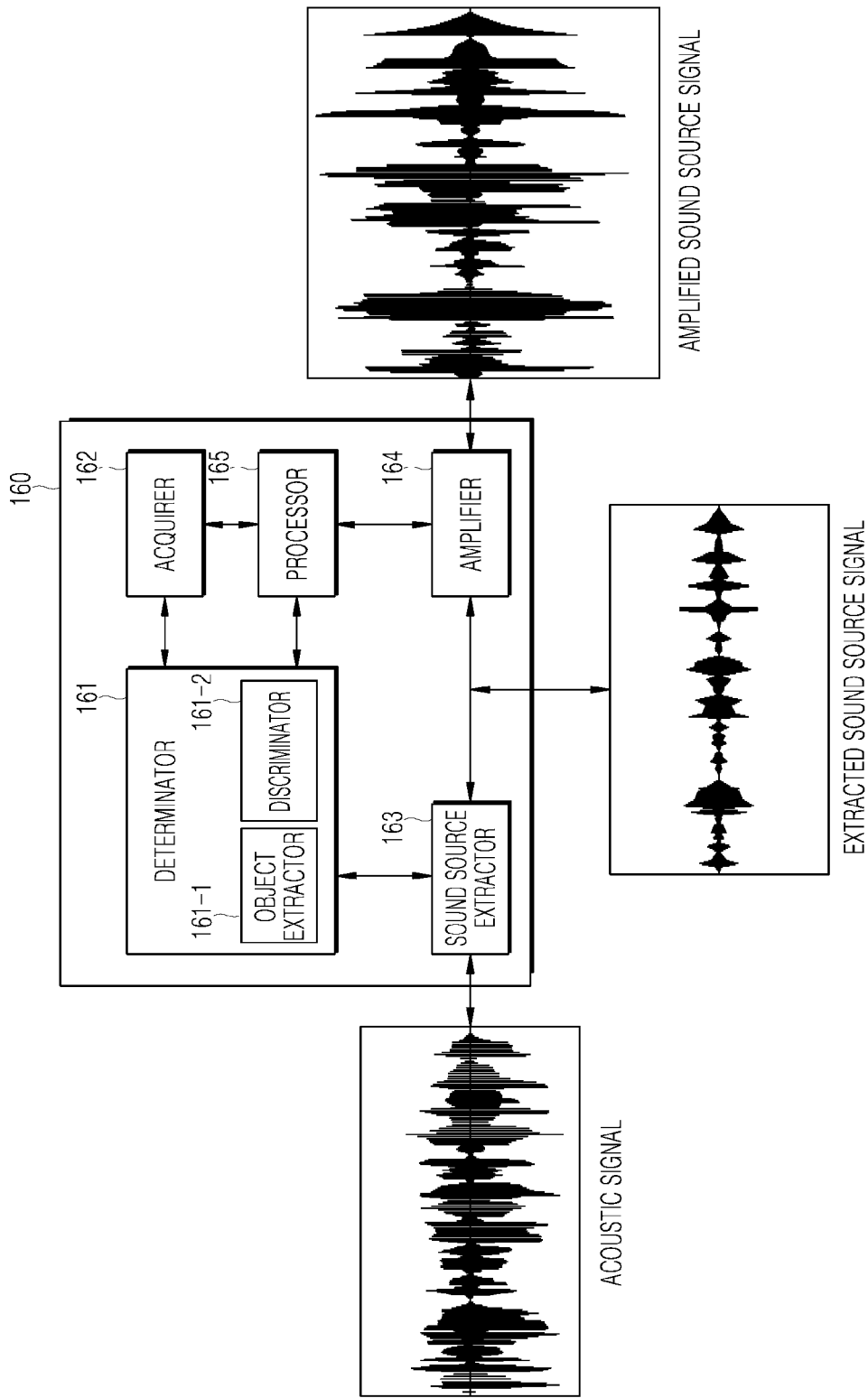
FIG. 4 is a view schematically illustrating a detailed configuration of a signal processor of the sound source focus device of FIG. 3.

FIG. 4 is a view schematically illustrating a detailed configuration of a signal processor of the sound source focus device of FIG. 3. Hereinbelow, description overlapping with that of FIGS. 1 to 3 will be omitted. Referring to FIG. 4, the signal processor 160 includes a determinator 161, an acquirer 162, a sound source extractor 163, an amplifier 164, and a processor 165. As a selective embodiment, the signal processor 160 may include one or more processors. As a selective embodiment, the determinator 161, the acquirer 162, the sound source extractor 163, the amplifier 164, and the processor 165 may correspond to one or more processors. As a selective embodiment, the determinator 161, the acquirer 162, the sound source extractor 163, the amplifier 164, and the processor 165 may correspond to software components configured to be executed by one or more processors.

The determinator 161 may determine the user's object of interest from a video signal of the video content which is being played. To this end, the determinator 161 may include an object extractor 161-1 and a discriminator 161-2.

The object extractor 161-1 extracts the user's object of interest corresponding to the tracking of the user's vision from the video signal. In the present embodiment, in order to track the user's vision, the sound source focus device 100 may further include a camera (not illustrated). In the present embodiment, the vision tracking is a technique which senses a movement of the eye in order to track the eye position and may use any one of three methods, including a video analysis method, a contact lens method, and a sensor attaching method depending on a device type. According to the video analysis method, an image which is photographed by the camera in real-time is analyzed to detect a motion of a pupil and a gaze direction is calculated with respect to a fixed position reflected onto a cornea. The above-described calculation method is referred to as pupil center cornea reflection (PCCR). The contact lens method, using reflected light of a mirror-embedded contact lens or a magnetic field of a coil-embedded contact lens, is not convenient but it is highly accurate. According to the sensor attaching method, a sensor (not illustrated) is attached around the eye and a magnetic field is used in accordance with the eye movement so that even though the user closes their eyes, the eye movement can still be detected.

As described above, the object extractor 161-1 may extract an image of an object of interest, including the user's object of interest from the video signal using the tracking of the user's vision.

The discriminator 161-2 may decide the type of the user's object of interest based on characteristic information about the image of the user's object of interest extracted by the object extractor 161-1. The discriminator 161-2 may extract the feature point of the image of the user's object of interest extracted by the object extractor 161-1. Unlike document data, since the image data cannot be immediately interpreted, the feature point needs to be extracted first. For example, when a circle and a polygon are distinguished, feature points which represent apexes are used so that when an object has three apexes, the object is determined as a triangle and when there is no apex, the object is determined as a circle. In addition to the apexes, the feature points may be extracted to catch various patterns. The feature point catches a point which shows a rapid change on the image.

The discriminator 161-2 may use various methods to extract a feature point of each object from the image. For example, scale-invariant feature transform (SIFT) or speeded-up robust feature (SURF) may be used.

SIFT is an algorithm which extracts a feature point regardless of an image size. For example, when a feature point representing an apex is used, the size which forms an apex may vary depending on the image size. In this case an apex can be extracted from an image with a specific size, but a problem may arise wherein an apex cannot be extracted from an image which is relatively large or relatively small. SIFT is an algorithm which solves the above-described problem to be able to extract a feature point of a specific pattern regardless of the image size. SURF is an algorithm which finds a feature point of the image quicker than SIFT. Like SIFT, SURF finds feature points regardless of the image size but is superior in terms of speed. SURF may be used to analyze a large image or video file. Although SIFT and SURF have been described as algorithms which extract a feature point for one or more objects from an image, SIFT and SURF are merely illustrative and various methods may be used.

The discriminator 161-2 may recognize the type of the object based on the feature point for one or more objects. The discriminator 161-2 may recognize the object using various methods and, for example, may recognize the type of the object by means of an algorithm such as a support vector machine (SVM) or neural networks (NN). When the type of the object is recognized, it means that a name of the object and/or what the object is, is discovered. For example, when the object is a musical instrument, the name of the musical instrument is discovered and when the object is a celebrity, the name of the celebrity is found out. In this case, the discriminator 161-2 may refer to information about the musical instrument or the celebrity stored in the database 140 which has been constructed in advance. The information about the musical instrument or the celebrity may be data which stores an image and the name of the musical instrument or the celebrity and a unique sound source. Therefore, the discriminator 161-2 compares the image of the object with existing data to find, from the existing data, a musical instrument or a celebrity having the same image as the corresponding object in order to find the type of the object, for example, the name and also find the unique sound source information of the musical instrument or the celebrity.

The SVM is an algorithm which finds a hyperplane which satisfactorily distinguishes given data and uses only a support vector located at a boundary between different classes of data. The NN is an algorithm which learns a weight so as to maximize a likelihood, defined through an energy, and minimize errors and also learns all the weight matrixes between layers using all the data. In this case, when the algorithm for recognizing the type of object is executed, a supervised method, an unsupervised method, and a semi-supervised method may be applied.

According to the supervised method, when data is provided together with a correct answer, the learning is performed and, according to the unsupervised method, when there is no correct answer, the learning is performed only with the data. For example, when the learning is performed using an image (data) of a musical instrument A and a name (correct answer) of the musical instrument, the learning is the supervised learning method. In contrast, when the learning is performed only with the image (data) of the musical instrument A, by automatically finding a difference from other images, the learning is the unsupervised learning method. According to the semi-learning method, only some data amongst the entirety data has a correct answer, the data which does not have a correct answer is learned by referring to the correct answer present in some of the data. When the algorithm for recognizing the type of object is performed by the supervised method or the semi-supervised method, the learning data uses an image extracted by the object extractor 161-1, according to the embodiment of the present disclosure, so that a recognition rate may be stably achieved. As described above, the discriminator 161-2 may decide the type of the user's object of interest based on characteristic information of the image of the user's object of interest extracted by the object extractor 161-1.

As a selective embodiment, the object extractor 161-1 may extract an image of a user's object of interest including the user's object of interest as an object which is magnified in accordance with a zoom-in operation of the user, from the video signal. Here, the zoom has variable focal lengths and is achieved by adjusting a distance between lenses by relatively moving a front lens which mainly has a positive, and a rear lens which mainly has a negative power. Generally, a camera employs a configuration for the zoom by changing the focal distance of the lens to be converted into a wide-angle lens or a telephoto lens to have various viewing angles in one place without the movement of the user. The zoom is mainly classified into an optical zoom and a digital zoom. The optical zoom is a zoom which is achieved by using an optical lens and relatively moving the optical lens to magnify the subject with variable focal distances. The digital zoom is, for example, a zoom which magnifies the image in a charge-coupled device (CCD), separately from the optical lens, and magnifies the image in a graph program such as Photoshop or ACDsee. The digital zoom is performed by cutting a part of the image to magnify the image.

Therefore, a value of a newly generated pixel when the zoom function is performed is a value interpolated using an existing image value so that the image is less delicate than the optical zoom due to its characteristic. However, even though the optical lens is not used, it appears as if the optical lens is used. Therefore, the digital zoom function is implemented in the image sensor so that an ultra-light sensor with the zoom function may be produced.

In the present embodiment, the object extractor 161-1 may extract an image of a user's object of interest including a user's object of interest as an object which is magnified in accordance with a digital zoom-in operation of the user, from the video signal.

The discriminator 161-2 may decide the type of the user's object of interest based on characteristic information of the image of the user's object of interest. Hereinbelow, the detailed description of the discriminator 161-2 is the same as the above description so that the detailed description will be omitted.

The acquirer 162 may acquire unique sound source information for the user's object of interest determined by the determinator 161. The acquirer 162 may acquire unique sound source information for the user's object of interest from the database 140. The acquirer 162 may acquire unique sound source information for the user's object of interest by referring to information about the object stored in the database 140. Here, the information about the object may include data which stores an image, a name, and a unique sound source of the object. For example, when the object is a musical instrument or a celebrity, the information about the object may include data which stores an image and a name of the musical instrument or the celebrity and a unique sound source. Therefore, the acquirer 162 may acquire unique sound source information corresponding to an image of the user's object of interest determined by the determinator 161 from the database 140. As a selective embodiment, the acquirer 162 acquires the type of the user's object of interest and unique sound source information output by the user's object of interest from an image of the user's object of interest using a deep neural network model which is trained in advance to output the type of the object and unique sound source information, output by the object from an object image.

The sound source extractor 163 may extract an actual sound source for the user's object of interest corresponding to the unique sound source information for the user's object of interest from the acoustic signal included in the video contents. The sound source extractor 163 may extract an actual sound source for the user's object of interest by filtering only the unique sound source information for the user's object of interest from the acoustic signal.

The amplifier 164 may output an actual sound source for the user's object of interest amplified by multiplying the actual sound source for the user's object of interest extracted by the sound source extractor 163 by a predetermined gain value. As a selective embodiment, the amplifier 164 multiplies an acoustic signal excluding an actual sound source for the user's object of interest extracted by the sound source extractor 163, that is, a sound source output by the objects other than the user's object of interest by a predetermined minus gain value to attenuate and output the sound source. Therefore, the sound source of the user's object of interest may be listened to more loudly, and the sound source of the other objects may be listened to more quietly.

When the tracking of the user's vision tracking is complete, the amplifier 164 ends the actual sound source amplification for the user's object of interest and the processor 165 resumes playing the video content, including an acoustic signal in which sound sources output by the objects are mixed. When the user's zoom-out manipulation is received, the amplifier 164 ends the actual sound source amplification for the user's object of interest and the processor 165 resume to playing the video content, including an acoustic signal in which sound sources output by the objects are mixed.

When the determinator 161 determines the user's object of interest, the processor 165 processes the user's object of interest to be brighter than the other objects, so that the user's object of interest may be emphasized, more than the other objects, and plays the content.

Figure 5:
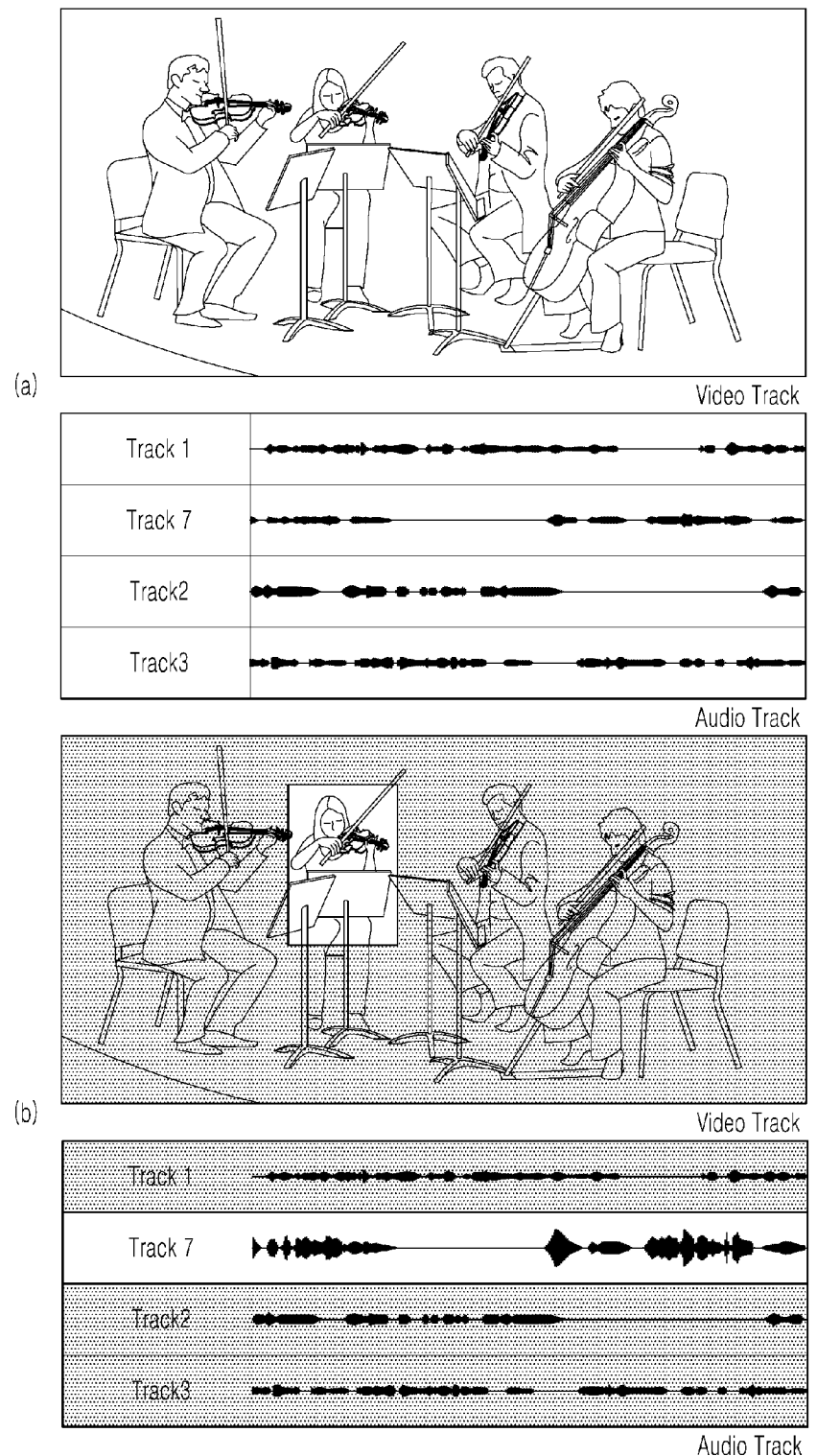
FIG. 5 is an exemplary view of a sound source extracting a result of a user's object of interest as compared with an acoustic signal of video content according to an embodiment of the present disclosure.

FIG. 5 is an exemplary view of a sound source extracting the result of a user's object of interest as compared with an acoustic signal of video content according to an embodiment of the present disclosure. Hereinbelow, description overlapping with that of FIGS. 1 to 4 will be omitted.

Referring to FIG. 5, FIG. 5A illustrates a video signal output from a video track of the video content and an acoustic signal output from an audio track of the video content.

FIG. 5B illustrates an example wherein the user's object of interest of a video signal output from a video track of the video contents is emphasized by the tracking of the user's vision or zoom-in being displayed and an example that a sound source output by the user's object of interest, among the acoustic signals output from an audio track of the video content, is amplified more than the sound source of the other objects to be output.

Figure 6:
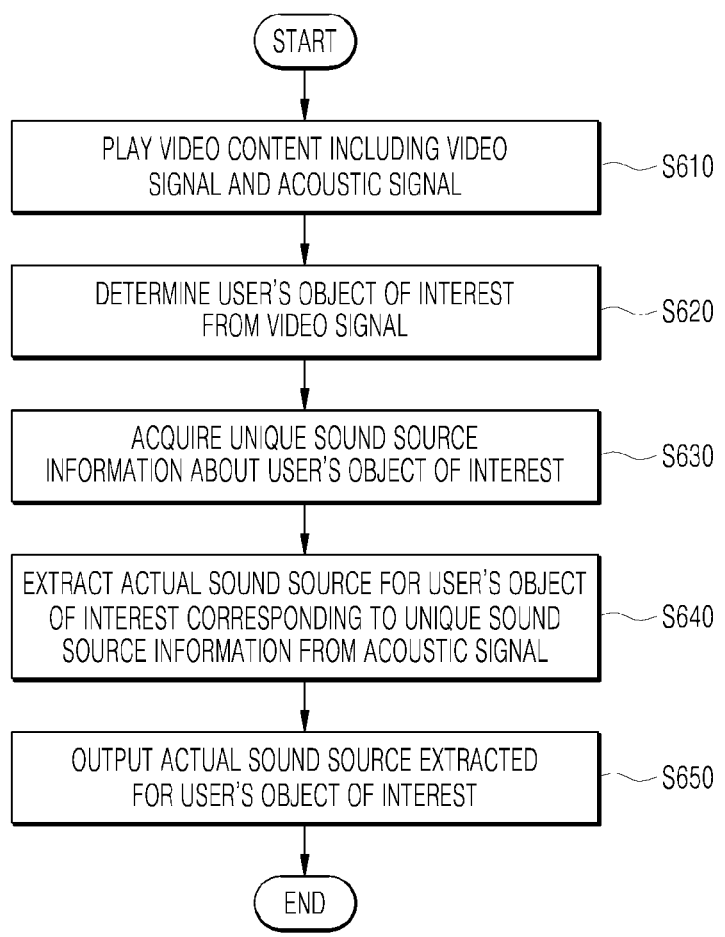
FIG. 6 is a flowchart for explaining a sound source focus method according to an embodiment of the present disclosure.

FIG. 6 is a flowchart for explaining a sound source focus method according to an embodiment of the present disclosure. Hereinbelow, description overlapping with that of FIG. 1 through FIG. 5 will be omitted.

Referring to FIG. 6, in step S610, the sound source focus device 100 plays a video signal including at least one moving object and an acoustic signal in which sound sources output by the object are mixed.

In step S620, the sound source focus device 100 determines a user's object of interest from the video signal. The sound source focus device 100 extracts an image of the user's object of interest including the user's object of interest which corresponds with the tracking of the user's vision, from the video signal and determines the type of the user's object of interest based on chracteristic information of the image of the user's object of interest. The sound source focus device 100 extracts the image of the user's object of interest including the user's object of interest as an object magnified in accordance with a user's zoom-in operation from the video signal and determines the type of the user's object of interest based on characteristic information of the image of the user's object of interest.

In step S630, the sound source focus device 100 acquires unique sound source information for the user's object of interest. The sound source focus device 100 may acquire unique sound source information for the user's object of interest from the database. The sound source focus device 100 may acquire unique sound source information for the user's object of interest by referring to information about the object stored in the database. Here, the information about the object may include data which stores an image, a name, and a unique sound source of the object. As a selective embodiment, the sound source focus device 100 acquires the type of the user's object of interest and unique sound source information output by the user's object of interest from an image of the user's object of interest using a deep neural network model which is trained in advance to output the type of the object and unique sound source information output by the object from an object image.

In step S640, the sound source focus device 100 extracts an actual sound source for the user's object of interest corresponding to the unique sound source information from the acoustic signal. The sound source focus device 100 may extract an actual sound source for the user's object of interest by filtering only the unique sound source information for the user's object of interest from the acoustic signal.

In step S650, the sound source focus device 100 may output an actual sound source extracted for the user's object of interest. Here, the sound source focus device 100 may output an actual sound source for the user's object of interest amplified by multiplying the actual sound source for the user's object of interest extracted by a predetermined gain value. As a selective embodiment, the sound source focus device 100 multiplies an acoustic signal excluding an actual sound source for the extracted user's object of interest, that is, a sound source output by other objects other than the user's object of interest by a predetermined minus gain value to attenuate and output the sound source.

As a selective embodiment, when the tracking of the user's vision is complete, the sound source focus device 100 ends the actual sound source amplification for the user's object of interest and resumes playing the video content including an acoustic signal in which sound sources output by the objects are mixed. Furthermore, when the user's zoom-out operation is received, the sound source focus device 100 ends the actual sound source amplification for the user's object of interest and resumes playing the video content including an acoustic signal in which sound sources output by the objects are mixed. As a selective embodiment, when the sound source focus device 100 determines the user's object of interest, the sound source focus device 100 processes the user's object of interest to be brighter than the other objects, so that the user's object of interest may be emphasized more than the other objects and play the content.

The above-described embodiments of the present disclosure may be implemented in the form of a computer program which can be executed by various components on a computer and the computer program may be recorded in computer readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the exemplary embodiments described above or by the use of such terms unless limited by the appended claims. Also, it should be apparent to those skilled in the art that various modifications, combinations, and alternations can be made depending on design conditions and factors within the scope of the appended claims or equivalents thereof.

Therefore, technical ideas of the present disclosure are not limited to the above-mentioned embodiments, and it is intended that not only the appended claims, but also all changes equivalent to claims, should be considered to fall within the scope of the present disclosure.

What is claimed is:

1. A sound source focus method comprising:
   playing a video content comprising a video signal comprising at least one moving object and an acoustic signal in which sound sources output by objects are mixed;
   determining an object of interest of a user from the video signal;
   acquiring unique sound source information about the object of interest;
   extracting an actual sound source for the object of interest corresponding to the unique sound source information from the acoustic signal; and
   outputting the actual sound source extracted for the object of interest.

2. The sound source focus method according to claim 1, wherein the determining of the object of interest comprises:
   extracting an image of the object of interest comprising the object of interest in accordance with a vision tracking of the user from the video signal; and
   determining a type of the object of interest based on characteristic information of the image of the object of interest.

3. The sound source focus method according to claim 2, wherein the acquiring of unique sound source information comprises:
   acquiring the type of the object of interest and unique sound source information output by the object of interest from the image of the object of interest using a deep neural network model which is trained in advance to output the type of an object and unique sound source information output by the object from an object image.

4. The sound source focus method according to claim 2, further comprising:
   when the vision tracking of the user is complete, completing the extraction of the actual sound source for the object of interest and resuming playing the video content comprising the acoustic signal in which sound sources output by the objects are mixed.

5. The sound source focus method according to claim 1, wherein the determining of the object of interest comprises:
   extracting an image of the object of interest comprising the object of interest as an object which is magnified in accordance with a zoom-in operation from the video signal; and
   determining a type of the object of interest based on characteristic information of the image of the object of interest.

6. The sound source focus method according to claim 5, further comprising:

when a zoom-out operation is received, completing the extraction of the actual sound source for the object of interest and resuming playing the video content comprising the acoustic signal in which sound sources output by the objects are mixed.

7. The sound source focus method according to claim 1, wherein the outputting of the actual sound source includes:
amplifying and outputting the actual sound source extracted for the object of interest.

8. The sound source focus method according to claim 7, wherein the outputting of the actual sound source further includes:
attenuating and outputting the sound source output by the objects other than the object of interest.

9. The sound source focus method according to claim 1, further comprising:
after the determining of the object of interest,
processing the object of interest to be brighter than the objects other than the object of interest in order to play the video content.

10. A non-transitory computer-readable recording medium for storing a program, which when executed by one or more processors of a device, causes the device to perform:
playing a video content comprising a video signal comprising at least one moving object and an acoustic signal in which sound sources output by objects are mixed;
determining an object of interest of a user from the video signal;
acquiring unique sound source information about the object of interest;
extracting an actual sound source for the object of interest corresponding to the unique sound source information from the acoustic signal; and
outputting the actual sound source extracted for the object of interest.

11. A sound source focus device comprising one or more processors, wherein the one or more processors is configured to play video content comprising a video signal comprising at least one moving object and an acoustic signal in which sound sources output by objects are mixed; determine the object of interest from a user from the video signal; acquire unique sound source information about the object of interest; extract an actual sound source for the object of interest corresponding to the unique sound source information from the acoustic signal; and output the actual sound source extracted for the object of interest.

12. The sound source focus device according to claim 11, wherein the one or more processors is configured to, when the object of interest is determined, extract an image of the object of interest comprising the object of interest in accordance with a vision tracking of the user from the video signal; and determine a type of the object of interest based on characteristic information of the image of the object of interest.

13. The sound source focus device according to claim 12, wherein the one or more processors is configured to, when the unique sound source information is acquired, acquire the type of the object of interest and the unique sound source information output by the object of interest from the image of the object of interest using a deep neural network model which is trained in advance to output the type of an object and unique sound source information output by the object from an object image.

14. The sound source focus device according to claim 12, wherein the one or more processors is further configured to, when the vision tracking is complete, complete the extraction of the actual sound source for the object of interest and resume playing the video content comprising the acoustic signal in which sound sources output by the objects are mixed.

15. The sound source focus device according to claim 11, wherein the one or more processors is configured to, when the object of interest is determined, extract an image of the object of interest comprising the object of interest as an object which is magnified in accordance with a zoom-in operation from the user from the video signal; and determine a type of the object of interest based on characteristic information of the image of the object of interest.

16. The sound source focus device according to claim 15, wherein the one or more processors is further configured to, when a zoom-out operation is received, complete the extraction of the actual sound source for the object of interest and resume playing the video content comprising the acoustic signal in which sound sources output by the objects are mixed.

17. The sound source focus device according to claim 11, wherein the one or more processors is further configured to, when the actual sound source is output, amplify and output the actual sound source extracted for the object of interest.

18. The sound source focus device according to claim 17, wherein the one or more processors is further configured to, when the actual sound source is output, attenuate and output the sound source output by the objects other than the object of interest.

19. The sound source focus device according to claim 11, wherein the one or more processors is further configured to, after determining the object of interest, process the object of interest to be brighter than the objects other than the object of interest in order to play the video content.

* * * * *